United States Patent [19]

Gielow et al.

[11] Patent Number: 4,457,550

[45] Date of Patent: Jul. 3, 1984

[54] MEANS FOR REDUCING VEHICLE DRAG

[75] Inventors: Robert L. Gielow, Farmington Hills; James C. Paul, Ann Arbor, both of Mich.

[73] Assignee: Fruehauf Corporation, Detroit, Mich.

[21] Appl. No.: 354,125

[22] Filed: Mar. 2, 1982

Related U.S. Application Data

[63] Continuation-in-part of Ser. No. 138,136, Jul. 7, 1980, abandoned.

[51] Int. Cl.³ .............................................. B62D 35/00
[52] U.S. Cl. .................................... 296/1 S; 105/2 R; 296/91
[58] Field of Search ................... 296/1 S, 91; 105/2 R; 244/130

[56] References Cited

U.S. PATENT DOCUMENTS

| | | | |
|---|---|---|---|
| 3,934,922 | 1/1976 | MacCready et al. | 296/1 S |
| 3,999,797 | 12/1976 | Kirsch et al. | 296/1 S |
| 4,035,013 | 7/1977 | Abbott | 296/1 S |
| 4,113,299 | 9/1978 | Johnson | 296/1 S |
| 4,269,444 | 5/1981 | Emory | 296/1 S |

Primary Examiner—Richard A. Bertsch
Attorney, Agent, or Firm—Ralph J. Skinkiss

[57] ABSTRACT

An edge for frontal engagement with air flow as occurs when vehicles are moving in an air environment. The edge is elongate and intended to wrap around an existing corner where two substantially planar surfaces intersect, one of the planar surfaces being a front surface and the other planar surface being a rearwardly receding flanking surface such as a top surface or a side surface of a vehicle. The edge rises abruptly from the front plane and moves forwardly and outwardly in a convex arc to a point of abrupt inflection outside of the flanking plane and adjacent the front plane as extended through the flanking plane. The discontinuity or inflection is a change from convexity to concavity formed by alternate concavity and convexity and progressing generally toward faired contact with the flank plane.

14 Claims, 9 Drawing Figures

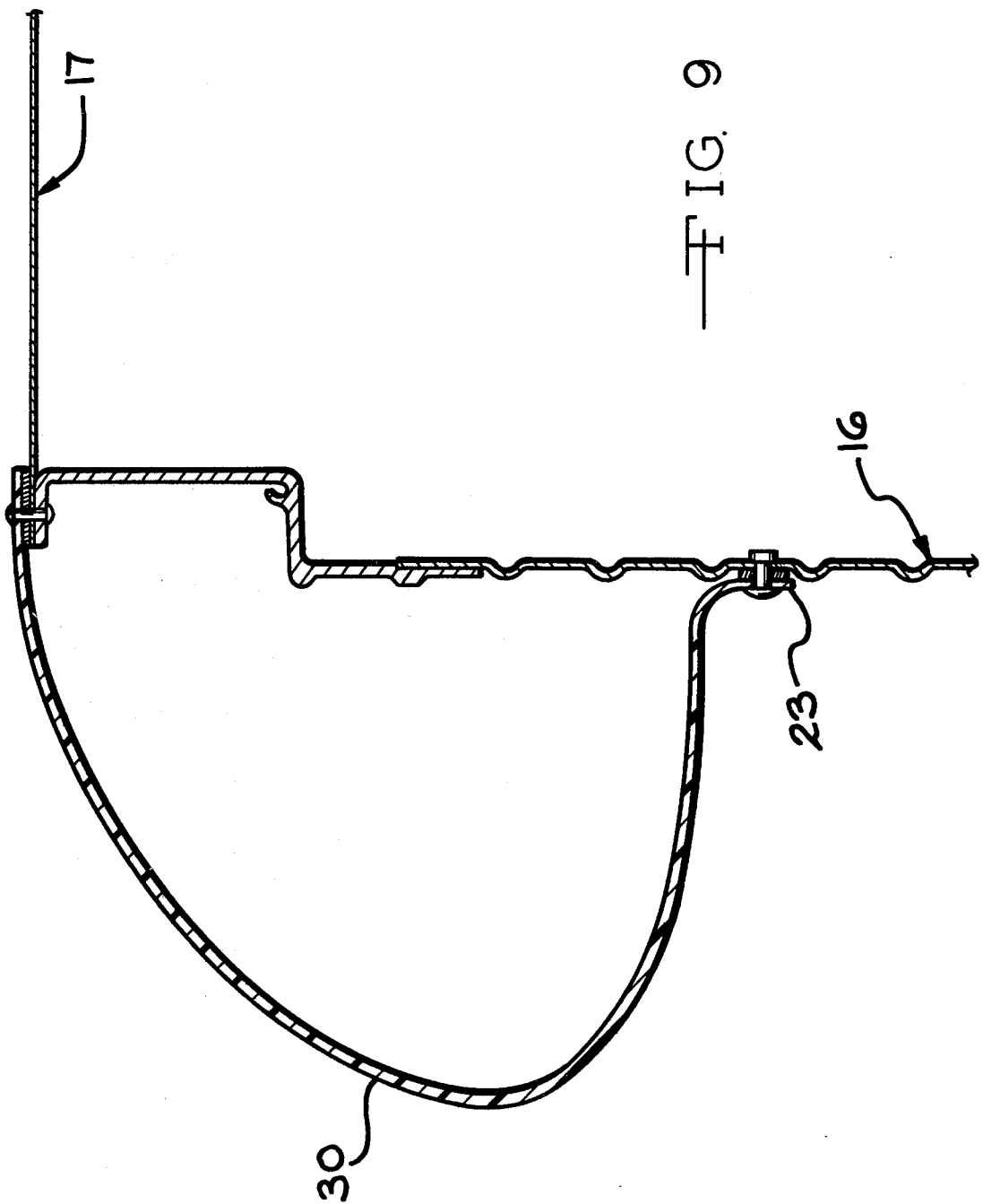

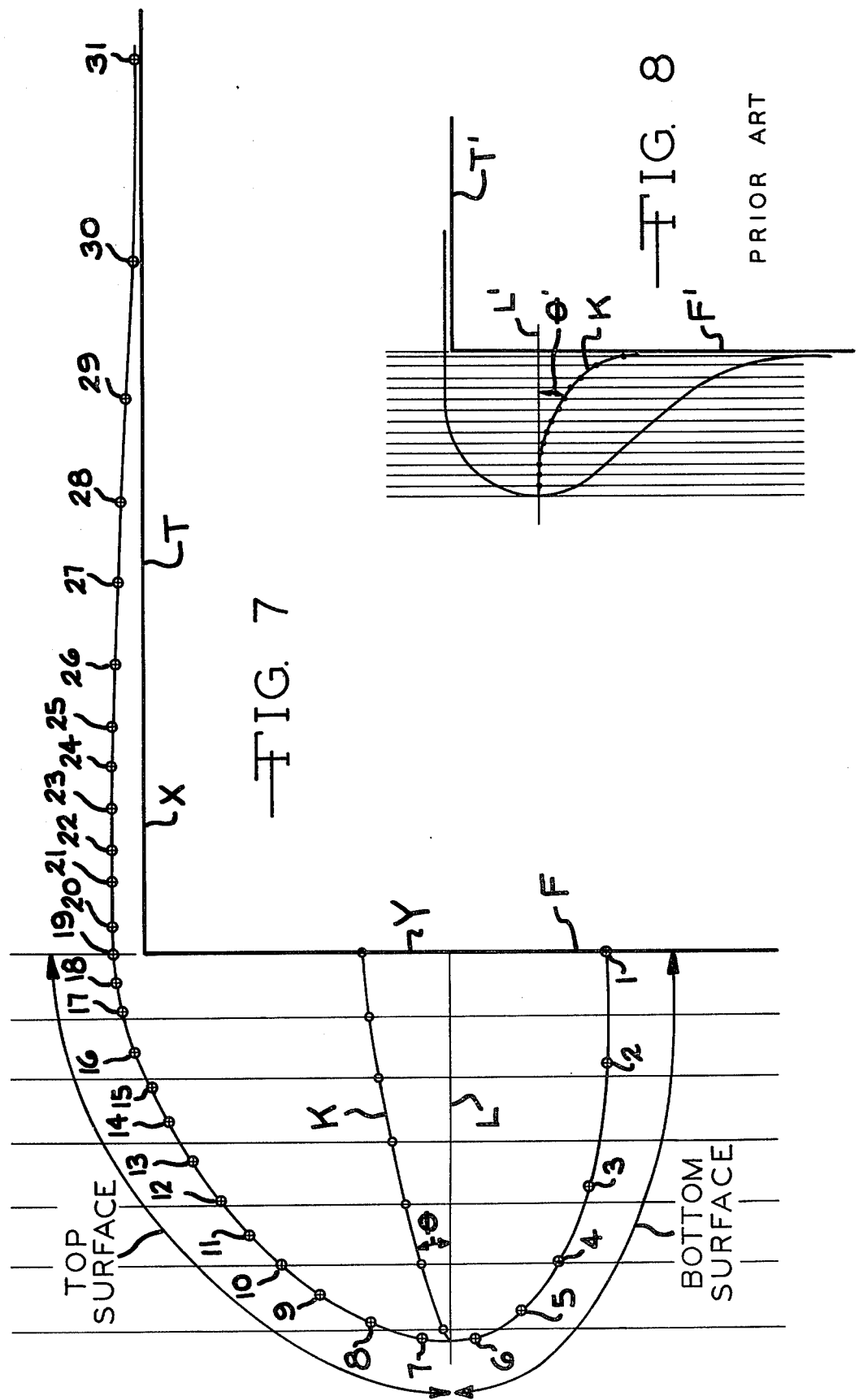

MEANS FOR REDUCING VEHICLE DRAG

RELATED APPLICATIONS

This application is a continuation in part of our co-pending application Ser. No. 138,136 filed Apr. 7, 1980, now abandoned.

BACKGROUND OF THE INVENTION

A conscious and ongoing effort to reduce drag in vehicular structures is seen in the prior art and the reduction of drag or resistance in vehicles is of increasing importance where fuel economy is an increasingly large consideration in automotive and vehicular design. Current application of aerodynamic concepts shows that many prior approaches to streamlining were of more optical and retinal satisfaction than the achievement of minimal drag. While this is true in automobiles, it is particularly true where trucks and trailers are considered because of the substantial surfaces involved and the enormous increase in reliance upon trucks and trailers for haulage and heavy transport. This is accentuated by the need for maximum cargo space and the use of relatively sharp corners and boxy appearance at the front of trucks and trailers.

Early efforts at minimization of drag were found in changing body styles; in bridging between tractor and trailer as in U.S. Pat. No. 3,945,677 to Ronald A. Servais, et al; in the modification of the front wall of trailers as in U.S. Pat. No. 3,415,566 to W. H. Kerrigan; and in the spaced foils or shields as seen in U.S. Pat. No. 2,964,352 of J. Werner. More lately, the direction taken by persons seeking to minimize drag in such vehicles is exemplified by the use of corner plates having gradual and concave arcuate rise from a plane transverse to the principal direction of vehicle travel and then reversing in an arc closing on the corner and in parallel side contact with the vehicle body. This work is seen in the recent U.S. Pat. Nos. 3,934,922 and 4,057,280 to Paul B. MacCready, Jr. and Peter B. S. Lissaman.

By contrast, the present invention provides a distinctly different approach to reduction of drag by the utilization of a drag attenuating corner cover similar to a subsonic airfoil comprising an elongate strip having a surface which abruptly arises from a transverse front surface or plane; the strip then wraps around the corner in a convex or bulbous arch and returns or reverses direction outboard of the flank plane of the vehicle body and tapers generally back toward the flank plane of the vehicle body in one or more undulations or ripples formed by alternate concavities and convexities until the surface fairs into contact against the flank plane of the body well rearward of the projected intersection of the front and flank planes. "Front" as used here has reference to the surface first engaging air or wind flow and which surface is generally perpendicular to the airflow. "Flank" as used here means the surface plane as, for example, side and top of a vehicle which is generally parallel to the airflow in moving vehicles. The undulating or ripple surface commencing with a discontinuity outboard of the flank plane and diminishing rearwardly to closure against the flank plane discourages and delays boundary layer separation as the air flows across the flank plane thereby reducing aerodynamic drag.

Alternatively the elongate stip may wrap the corner in a convex or bulbous arch lying below the flank plane of the vehicle body and extending rearward asymptoticly joining the flank plane at its leading edge.

Accordingly, the principal object is to provide a wholly new edge surface useful in reducing drag in vehicles.

Another object is to provide an edge surface which may be added onto or which may cover existing corner or edge contours and which is economical to form and install as either an original or an "after market" add-on construction.

Another object is to apply aerodynamic boundary layer concepts for attached flow in solving the problems of resistance or drag in vehicles at the corners thereof in a manner compatible with present day vehicle construction.

Another object is to provide a device for enshrouding any forward facing corner that is itself too sharp to maintain attached flow and may be applied to any corner which faces into the oncoming airstream.

Another object is to provide an "add-on" device which exhibits attached flow around a previously separated flow corner.

Still other objects, including applicability to various flow facing surfaces and corners, will be better appreciated as the description proceeds.

In the Drawings

FIG. 7 is a graphic plot of the preferred contour showing the forward projecting bulbous portion, the flanking undulations and the preferred relationship with respect to the vehicle body.

FIG. 8 is a graphic plot of a typical contour taught in the prior art and its relationship to the vehicle body.

FIG. 9 shows an alternate construction of a drag reducing edge embodying the invention and means for attaching same to a vehicle body.

General Description

Figure 1:
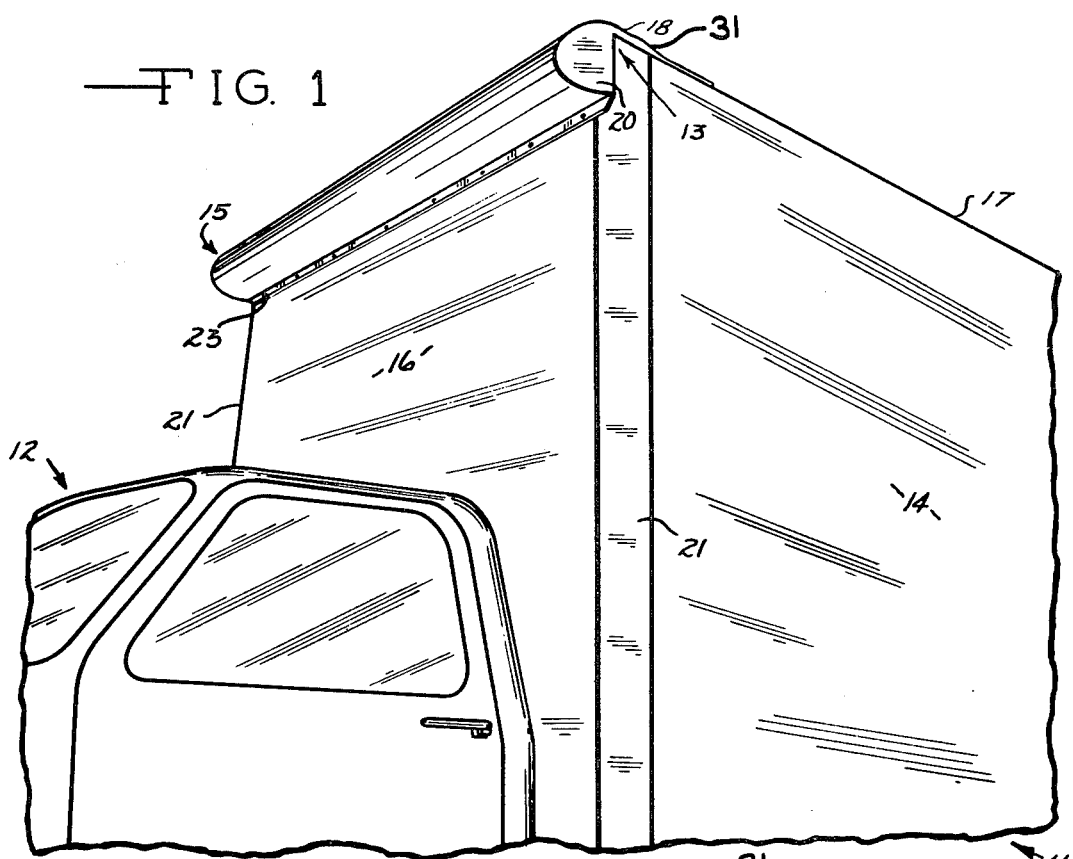
FIG. 1 is a perspective view of a truck in phantom line and the front wall of the truck includes a drag reducing edge structure in accord with the present invention between the front plane surface and the top plane surface of the truck.

An elongate edge structure or edge cover is provided for application over abrupt vehicle edges to engage an airstream and produce a smooth airflow around the newly formed corner. In cross section, the edge cover structure is fastened to a frontal plane surface and the edge cover surface rises forwardly and abruptly therefrom in a compound curve which fully reverses its direction in progressing through about 180 degrees of arc and, in the preferred embodiment, extends beyond the extended plane of the side or top surfaces and through the extended plane of the front surface outboard of the edge which is covered and to a point of curvalinear discontinuity or abrupt inflection where the convex curve changes to a concave arc. Thereafter, the surface of the edge cover progresses rearwardly in a direction reverse from the starting curvature and extending to blend substantially tangentially with the second (side or top) plane surface. The second plane surface is generally at right angles to the first and front plane surface. Thus, the edge cover extends horizontally across the front face of a trailer, truck or vehicle body and extends rearwardly to a faired connection with the top plane surface of the truck or vehicle. The same contoured edge cover, sized to the length of vertical edges, is useful in drag reduction and closes against the sides aft of the extended front plane surface of the truck or vehicle. The corners, where vertical and horizontal edges join, are mitred and fastening is by rivets, metal screws or other well known means, such as the use of adhesives and contact cements.

A device embodying the present invention provides an elongate forward-facing corner enveloping sheath having the configuration of a subsonic cambered airfoil for elimination of drag in sharp corners as are encountered on truck bodies, and trailers, vans and buses and the like. It is applicable wherever a corner faces the oncoming airstream. The objective is to provide a corner structure which reduces drag by assuring "attached airflow" over the flank surface. Generally, on large corner radii (about sixteen to eighteen inches), the flow remains reasonably attached at all vehicle speeds but as the radius of the corner diminishes as a function of styling or cargo considerations, then the flow commences to separate and such separation is an indicator of increasing vehicle drag.

The present invention provides forwardfacing surfaces for such low radii edges. The surface of the edge cover extends abruptly forward from a front plane, then the surface reverses extending rearward to the trailing or aft flank plane surface, such as the side or top of a truck flanking the front surface in subtle surface configuration to achieve an attached boundary layer at all speeds. In the preferred embodiment the forward surface of the edge cover is substantially convex to provide a constant velocity curve to a point of discontinuity or inflection outboard of the sidewall or flanking plane and near an extension of the frontal plane. Then the curvature shifts smoothly to a concave configuration and drops toward the side or top plane as it progresses aft in a continuous configuration which blends again into a shallow concavity and is thereafter faired to meet the top or side plane. In many instances, and depending upon the corner configuration, the "ripple" indicated by the foregoing description is but faintly discernible. The magnitude of the ripple is established by optimization of attached flow. The consequence is a structure which saves space, can be applied to existing vehicles as trucks, buses and the like, and provides optimum saving in drag reduction.

In use, substantial reduction in drag have been observed and depending on methods of computation, the overall savings in energy to trucks employing only a single top edge cover having the preferred configuration will range from about 0.50 to about 1.50 miles per gallon. This expressed on a percentage basis is between 9 percent and 33 percent improvement.

Specific Description

Referring to the drawings and first specifically to the FIG. 1 thereof, a truck body 11 on truck 12 is provided at the upper edge 13 of the cargo box 14 with an add-on edge cover 15 in accord with the present invention. Edge cover 15 includes a surface contour which rises from the front faced plane 16 of the truck body 11, curls forwardly, and then reverses itself in a convex initial contour preferrably extending outboard of the top plane 17 of the body 11 to a point of inflection or discontinuity 18 adjacent the projected front faced plane 16. The discontinuity 18, however subtle, comprises a change in curvature from convexity to concavity. At that point the surface is inflected. The surface continues aft gradually forming a second inflection point 31 and thereafter fairing toward the adjacent top plane 17. In some embodiments it may be desirable to provide additional inflection points following the second. It is believed that the second and any subsequent inflection points add energy to the boundary layer thereby inducing attached flow. The inflection points are requisite to providing a suitable aerodynamic attached flow around the corner 13.

Because the edge cover 15 is an elongate element with a uniform curvature over its entire length, the manufacture thereof may be easily achieved by simply contour reproducing means, as by rolling metal, stamping metal, extruding fiber reinforced plastic metal, drape molding thermoplastic material, injection molding, compression molding and the like to provide the outer contoured surface. Since the inside surface is merely a support for the outer functioning surface, the inside surface may be filled (as by inflation or foamed plastic), or may be structurally reinforced by attached membranes or struts running around the corner 13. In the structure shown in FIG. 1, mitre plates 20 close the ends of the edge covers 15 and the ends may be otherwise plugged.

Figure 2:
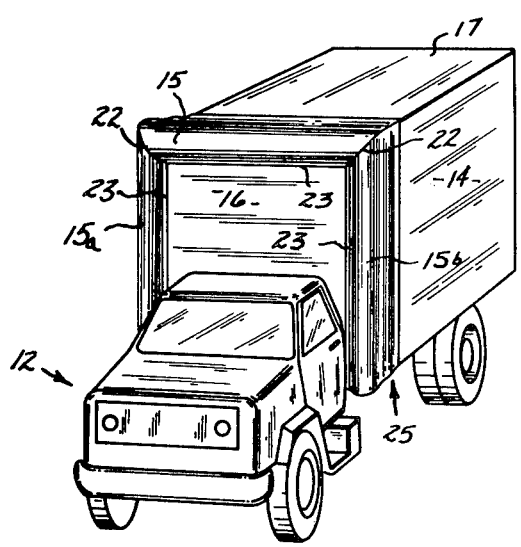
FIG. 2 is a perspective view of truck as seen in the FIG. 1 and wherein the drag reducing edges of the present invention extend around the vertical edges between the front plane and the side planes of the truck.

In FIG. 2, the upper edge cover 15 is flanked by edge covers 15a and 15b and covering vertical edges 21 at the intersection of front plane 16 and side planes 14. The cross section of the covers 15a and 15b is substantially identical to the cross section of the edge covers 15a and 15b and these are mitre joined or connected to the horizontal edge cover 15 at the mitre joints 22. The convex or bulbous forward protrusion of the edge covers 15 and 15a and 15b are thus all joined and face forwardly of the truck 12 to first encounter the principal airstream. The rippled or inflected surface aft extending portion of the edge covers 15, 15a and 15b are fastened to the planes 14 and 17 in faired relation and the frontal convex projections are secured to the front plane 16 as by means of the fastening flanges 23 and fastening means associated therewith.

Figure 3:
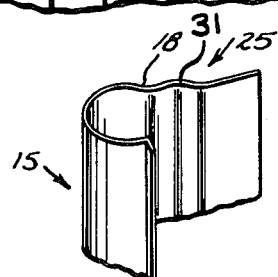
FIG. 3 is a fragmental perspective view of the drag reducing edge of the present invention and indicating its cross sectional configuration and indicating its amenability to stamping and extrusion by reason of its uniformity over the entire length.
Figure 4:
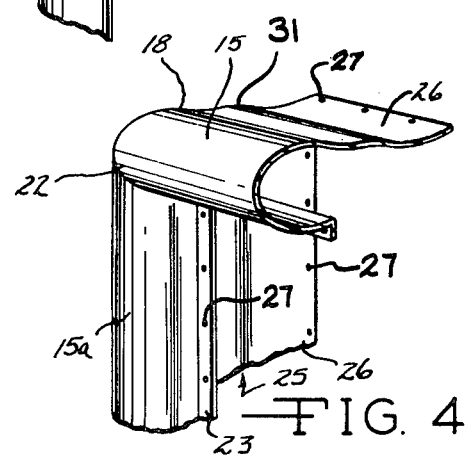
FIG. 4 is a partial perspective view of a corner using the present invention and indicating the mitred connection and simple add-on fastening.

FIGS. 3 and 4 are slightly exaggerated to illustrate the preferred ripple or inflected surface 25 as it appears in the edge covers 15, 15a and 15b aft of the first inflection or discontinuity 18. The integral fastening flange 23 is better appreciated and the faired trailing or aft faired portion 26 is better understood and includes fastener provisions as by rivet holes 27 in the flange 23 and in the faired portion 26 adjacent the rear edge thereof.

Figure 5:
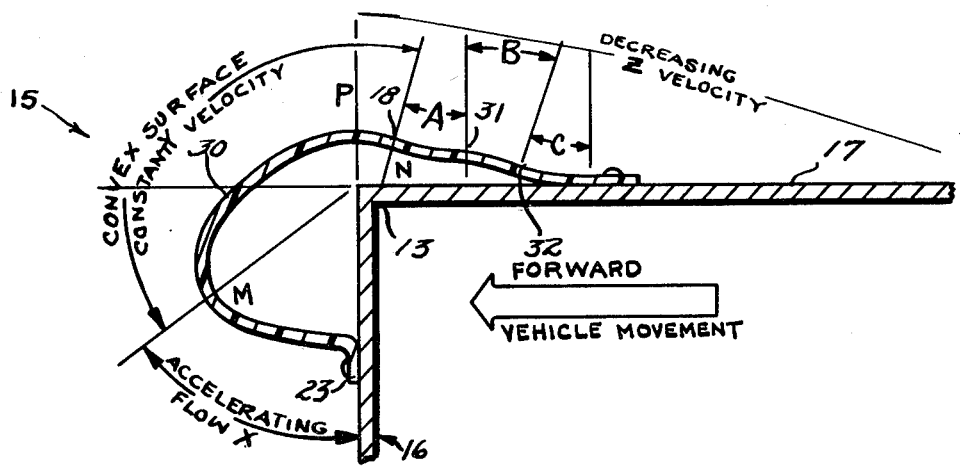
FIG. 5 is a full cross section elevation view taken through a length of the edge cover of the present invention and indicating the uniformity of the cross section through the entire length of the cover and indicating the various working portions of the edge cover surface to achieve boundary layer attachment.

In FIG. 5, an edge cover is shown with the ripple 25 slightly exaggerated so that the formation of the ripple 25 in these edge covers 15, 15a and 15b is better appreciated, both structurally and functionally, in providing minimization of aerodynamic drag in an edge structure in a manner hitherto unknown and in which a condition of attached flow obtains in respect to the corner contour at substantially all operating speeds of vehicles, trucks, trailers, vans, buses, and the like employing the edge covers 15, 15a and 15b of the present invention. The dimensions of the inflected surface aft of the forward protuberance is adjusted to demonstrate the desired attached flow and then that surface becomes the ultimate configuration of the edge covers 15, 15a and 15b. Thus, the exaggerations or dimensions in the FIG. 5 are intended to illuminate the approximate relative locations of the important surface portions.

The surface generated by the front protuberance 30 of the corner cover 15 is a convex surface rising transversely from the front wall 16 and smoothly contoured forwardly and outwardly at slightly varying rates of curvature, as shown, to a point about adjacent the projection P of the plane of the front wall 16 and slightly outboard of the plane of the top wall 17, as shown, or outboard of the plane of side walls 14 in consideration of the vertical covers 15a and 15b. The forward extending portion 30 is configured as the leading edge portion of a cambered subsonic airfoil. A discontinuity or first inflection 18 by reason of a change in surface curvature from convexity to concavity occurs thereupon with concavity progressing aft and toward the adjacent plane 17 (14 in covers 15a and 15b) producing a first zone concavity A. Further aft, the concavity A may be terminated by a very gradual and more subtle transition to a second convexity at a second inflection point 31. At the point 32 a shallow concavity again begins and the surface thereafter asympototicly joins plane 17 in an aftwardly continuing direction. The zone of convexity B is very gradual and the final aft zone C of concavity and fairing is a blending gradual progression.

Figure 6:
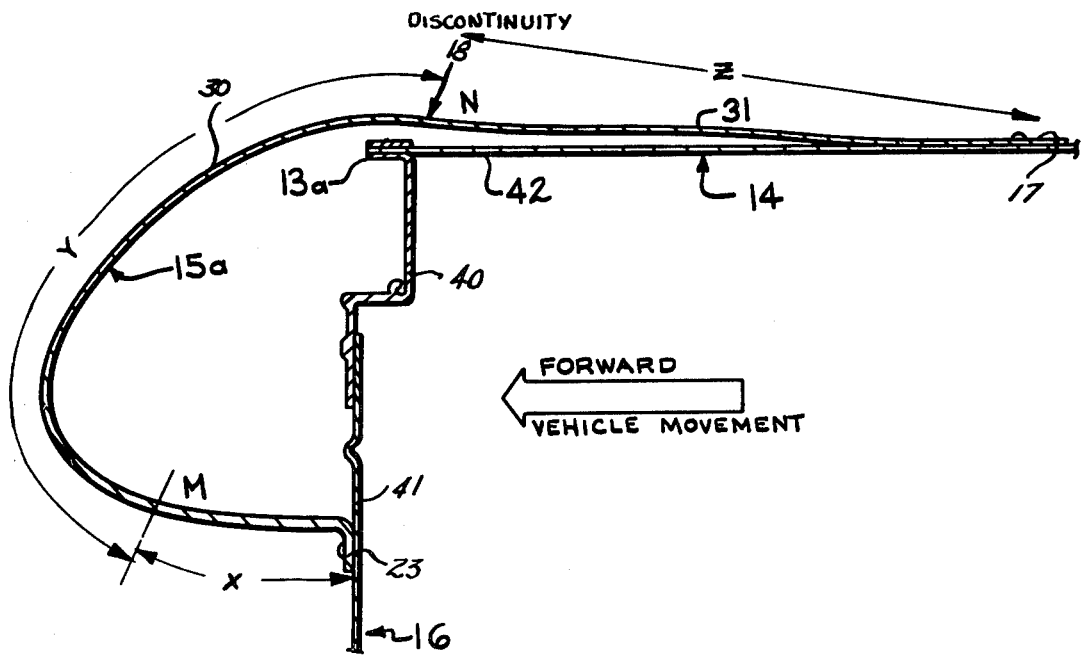
FIG. 6 is a more enlarged cross section elevation view as in FIG. 5 through a corner post of the cargo compartment and top or side of a truck and demonstrating the ripple surface aft of the discontinuity of surface.

FIG. 6 is also a section view taken transversely through a vertically oriented edge cover element 15a applied to the intersection of the front vertical wall 16 of a vehicle body and side wall 14. Corner post 40 secures the front skin 41 and the transverse side sheath 42. The cover 15a conforms to the description of the structure shown in FIG. 5 but in this view the relative velocity zones are indicated, progressing from the front wall 16 to point N. The first zone X is a zone of increasing or accelerating flow. Zone X extends outwardly from the front surface 16 through a short arcuate convex path, as shown, and at about the transition point M the aerodynamic flow becomes constant and the convex portion 30 maintains relatively constant velocity to the point of first discontinuity N. This is the constant velocity or mildly accelerating zone Y. Aft of the first discontinuity 18 and encompassing the rippling caused by the alternate concavities and convexities of regions A, B, and C, there is a zone Z, of decreasing velocity. In appropriate balance, the flow remains attached throughout zones X, Y and Z as evidenced by field testing with streamers.

By reference to the following tests, the performance can be best understood equated in terms of result:

Test Example 1

A test vehicle comprising an 18 foot box GMC Truck (Sierra Type) License 6924 AU (Michigan) was driven without drag reducing edge as illustrated in FIG. 1 over 81.1 miles in an elapsed time of 1.50 hours and used 17.73 gallons of gasoline. The average miles per gallon was 4.57.

The edge cover of the present invention was added as shown in FIG. 1 to the above-indicated truck and it was run over substantially the same course with elapsed miles of 80.8 miles in 1.57 hours and using 13.80 gallons of gasoline. The average miles per gallon was 5.85.

The computed savings on a miles per gallon basis was 1.28 miles per gallon and this on a percentage basis was 28 percent improvement.

Test Example 2

The same test vehicle (6924 AU) as in the first test was driven again over substantially the same terrain as in Test 1 and it included the add-on drag reducing edge as shown in FIG. 1 over 80.8 miles in an elapsed time of 1.55 hours. This used 13.30 gallons of gasoline. The average miles per gallon was 6.07. Compared against the run without the drag reducing edge, the computed savings on a miles per gallon basis was 1.50 miles per gallon and this on a percentage basis was a 33 percent improvement.

These tests were compared against a second running of the test vehicle (6924 AU) without the edge cover of FIG. 1 over substantially the same course for 80.2 miles in 1.60 hours and 14.98 gallons of gasoline were used at an average miles per gallon of 5.35. Based on this check, the savings in average miles per gallon in Test Example 1 was 0.50 miles per gallon and in Test Example 2 the savings in average miles per gallon was 0.72 miles per gallon.

All of the above testing was run with a GMC (Sierra) Truck control vehicle (25 W 556) having identical characteristics and the same model under identical weather and wind conditions and at substantially identical speeds, but without the edge cover of FIG. 1, as applied to the test vehicle, and on the control vehicle runs the average miles per gallon ranged between 7.11 and 7.82 verifying the extremes of performance exemplified in the tests.

These are substantial savings as related to increasing costs of energy and represent an improvement of between about nine percent and about 33 percent. As related to daily truck consumption figures, the test vehicles suggest that optimum drag reduction has been achieved and that the attached flow boundary phenomena was verified as having been obtained by observing plural ribbons or streamers in use on the edge covers and noting that, as applied to the edge cover surfaces, the attached flow obtained over the entire test runs in variant winds and with speeds between 50.7 and 54.2 miles per hour.

The drawings represent the installations set out in the Examples but final test figures are not available for the combination of upper edge cover 15 and the vertical edge covers 15a and 15b. Other fastening means may be used as required by the environment of use.

Preferred Configuration

Following are the coordinates of the preferred configuration suitable for use on a typical semi-trailer type vehicle or unitary truck cargo box having a road width of approximately 6 to 10 feet and a height of approximately 13½ feet. FIG. 7 provides a plot of the following points and serves to illustrate the subtle ripple extending rearward of point P. In FIG. 7 F represents the front wall or plane of the vehicle and T the roof or flank plane. The x coordinates are measured from the front wall F and y coordinates from the roof plane T.

TABLE I

| Point No. | x (inches) | y (inches) |
|---|---|---|
| 1 | 0 | −9.37 |
| 2 | −2.25 | −9.34 |
| 3 | −4.71 | −9.06 |
| 4 | −6.20 | −8.49 |
| 5 | −7.19 | −7.68 |
| 6 | −7.76 | −6.72 |
| 7 | −7.73 | −5.65 |
| 8 | −7.40 | −4.59 |
| 9 | −6.84 | −3.58 |
| 10 | −6.24 | −2.79 |
| 11 | −5.65 | −2.16 |
| 12 | −4.95 | −1.54 |
| 13 | −4.16 | −0.958 |
| 14 | −3.37 | −0.487 |
| 15 | −2.69 | −0.142 |
| 16 | −2.01 | +0.141 |
| 17 | −1.15 | +0.415 |
| 18 | −0.597 | +0.537 |
| 19 | 0.0 | +0.575 |
| 20 | +0.734 | +0.583 |
| 21 | +1.461 | +0.587 |
| 22 | +2.08 | +0.581 |
| 23 | +2.91 | +0.586 |
| 24 | +3.74 | +0.577 |
| 25 | +4.57 | +0.572 |
| 26 | +5.81 | +0.536 |
| 27 | +7.46 | +0.486 |
| 28 | +9.10 | +0.410 |
| 29 | +11.16 | +0.330 |
| 30 | +14.18 | +0.180 |
| 31 | +18.00 | +0.125 |

The configuration defined in Table I may be scaled down for use on smaller cargo vehicles such as utility trailers having a road width of approximately 4 to 6 feed and height of between 5 to 8 feet.

As can be seen in FIG. 7 points 1 through 19 inclusive define a configuration as that of a subsonic cambered airfoil leading edge. Line L is constructed normal to the front plane F and passing through the forward most tangent point on the profile. Thus line L may be thought of as representing the cord of an airfoil. An airfoil cord being defined as a straight line extending from the airfoil leading edge to its trailing edge. Line K is the locus of points equidistant from the top curve of the profile and the bottom curve otherwise defined in airfoil terms, as the mean camber line of the profile.

It is seen in FIG. 7 that the angle $\theta$ between the means camber line K and the pseudo cord line L is positive; thus the profile defined by points 1 through 19 may be said to have a positive camber or represent the leading edge portion of a positive cambered airfoil section.

FIG. 8 represents a typical profile taught in the prior art for use as an edge cover, see U.S. Pat. No. 4,057,280. The profile taught is not similar in any way to the leading edge of an airfoil; and in fact exhibits a negative camber as can be seen in comparing the mean camber line K with the pseudo cord line L.

Alternate Configuration

FIG. 9 shows an alternate configuration employing only the forward portion 30 of the total preferred profile represented by points 1 through 19 inclusive as shown in FIG. 7. In this alternate configuration the coordinates of the forward portion 30 of the profile are translated downward so that point 19 becomes essentially tangent to the roof plane T at the intersection with the forward wall F. Thus the y coordinates may be determined by subtracting 0.575 inches from the values presented above.

Having thus described our invention and the preferred operative embodiment thereof, those skilled in the art will readily perceive improvements, modifications and changes therein adapting the invention to particular operative settings and such improvements, modifications and changes are intended to be embodied by the scope of the present invention and limited only by the scope of our hereinafter appended claims.

We claim:

1. In combination with a first surface having a transverse orientation to a flowing fluid wherein said first surface terminatingly joins a second flanking surface extending downstream of said first surface, apparatus to encourage attainment of attached fluid flow over said second flanking surface comprising a transversly elongate element having a stream-wise cross section trace projecting upstream from said first surface, curvingly reversing direction downstream and tangently joining said second surface, said cross section trace simulating the leading edge portion of an airfoil shape.

2. the apparatus as claimed in claim 1 wherein said cross section trace defines a positively cambered airfoil section.

3. The apparatus as claimed in claim 1 wherein said cross section trace is generally described by the following rectangular coordinates, where the x axis is parallel to the direction of the fluid flow, the y axis perpendicular thereto and n equals the distance from the most upstream point of the cross section trace to the first surface as measured along the line representing the radius of curvature for that point:

| $\frac{x}{n}$ | $\frac{y}{n}$ |
|---|---|
| 0 | 0 |
| −0.0754 | −0.0048 |
| −0.1453 | −0.0202 |
| −0.254 | −0.0548 |
| −0.340 | −0.0906 |
| −0.426 | −0.1343 |
| −0.526 | −0.1938 |
| −0.626 | −0.268 |
| −0.714 | −0.346 |
| −0.789 | −0.425 |
| −0.819 | −0.521 |
| −0.936 | −0.652 |
| −0.977 | −0.786 |
| −0.981 | −0.923 |
| −0.909 | −1.044 |
| −0.784 | −1.145 |
| −0.595 | −1.219 |
| −0.284 | −1.254 |
| 0 | −1.257 |

4. The apparatus as claimed in claim 3 wherein said first surface is planner and n equals the shortest distance between said first surface and the most upstream point on said cross section trace.

5. The apparatus as claimed in claim 4 wherein said second surface is planner and said x axis lies within the plane of said first surface and said y axis lies within the plane of said second surface.

6. The apparatus as claimed in claim 1 wherein said cross section trace is generally defined by the following rectangular coordinates, where the x axis is parallel to the direction of the fluid flow, the y axis perpendicular thereto and n equals the distance from the most upstream point of the cross section trace to the first surface as measured along the line representing the radius of curvature for that point:

| $\frac{x}{n}$ | $\frac{y}{n}$ |
|---|---|
| 0 | −1.184 |
| −0.284 | −1.181 |
| −0.595 | −1.145 |
| −0.784 | −1.073 |
| −0.909 | −0.971 |
| −0.981 | −0.850 |
| −0.977 | −0.714 |
| −0.936 | −0.580 |
| −0.819 | −0.448 |
| −0.789 | −0.353 |
| −0.714 | −0.273 |
| −0.626 | −0.1947 |
| −0.526 | −0.1211 |
| −0.426 | −0.0616 |
| −0.340 | −0.0180 |
| −0.254 | +0.0178 |
| −0.1453 | +0.0525 |
| −0.0754 | +0.0679 |
| 0 | +0.0727 |
| +0.093 | +0.0737 |
| +0.1847 | +0.0742 |
| +0.263 | +0.0734 |
| +0.368 | +0.0741 |
| +0.473 | +0.0729 |
| +0.599 | +0.0723 |
| +0.734 | +0.0677 |
| +0.943 | +0.0614 |
| +1.150 | +0.0518 |
| +1.1411 | +0.0417 |
| +1.792 | +0.0227 |
| +2.275 | +0.01581 |

7. The apparatus as claimed in claim 6 wherein said first surface is planner and n equals the shortest distance between said first surface and the most upstream point on said cross section trace.

8. The apparatus as claimed in claim 7 wherein said second surface is planner and said x axis lies within the plane of said first surface and said y axis lies within the plane of said second surface.

9. An edge structure for reducing fluidynamic drag and disposed to engage a fluid stream to produce a substantially smooth flow comprising:
an abrupt forward extension originating from a transverse planar surface transverse to said fluid stream and arcuately reversing direction after exceeding the limits of a second planar surface extending through said first planar surface; and the trace of said edge subsequently progressing rearwardly in a reverse arcuate direction and thereafter substantially extending to blend tangentially with said second surface.

10. An edge cover for reducing aerodynamic drag around a corner formed by the convergence of a front plane and a flanking plane as in vehicles comprising:
an elongate cover element having an external regular contour adapted to contact a front planar surface in a line contact and rising in an arcuate convex path which turns and reverses outboard of a second planar surface flanking said front planar surface and thereafter a concave portion extending from said regular convex contour at a point of abrupt inflection to a faired and substantially tangential plane contact with said second planar surface.

11. An edge enveloping element for reducing aerodynamic drag in vehicles having surfaces encountering frontal engagement with an airstream comprising:
an elongate element of relatively constant cross section which cross section trace rises from a first front plane surface, arches in a relatively convex arc to a point outboard of the edge defined by the intersection of said first front plane with a second plane flanking said front plane where the regularity of said convex arc is interrupted by a merging concave extension of said arching surface at a point of abrupt inflection, and thereafter extending to approach said second front plane flanking said front plane and fairing toward connection therewith.

12. An edge enveloping structure for reducing aerodynamic drag disposed to engage an airstream producing a smooth flow about said edge comprising:
an elongate element having throughout its length a cross section, including an abrupt forward convex extension rising transversely from a front plane in a convex arc passing through a side plane extension through said front plane and progressing smoothly rearward toward said front plane, as extended, and thereafter changing from a convex arc to a concave arc, at a point of abrupt inflection and thereafter extending rearwardly in gradual undulations to faired contact with said side plane.

13. A drag reducing surface for disposing around an edge formed by two generally intersecting planes wherein one of the planes is a front plane as in vehicles, facing the principal direction of travel and the other plane is a flanking plane generally paralleling the airflow, said drag reducing surface having a first bulbous convex extension rising from contact with said front plane and substantially uniformly exceeding the limits of said edge and reversing at point of abrupt inflection and continuing gradually in an undulating surface having alternating convexity and concavity to substantial tangential contact with said flanking plane.

14. An elongate edge enveloping structure for reducing aerodynamic drag and disposed to engage an airstream to produce smooth flow about said edge wherein said edge is formed by intersection of a front planar surface and a surface flanking said front surface of a vehicle, the combination comprising:
a first convex arcuate roll surface rising abruptly from said front planar surface and progressing through approximately 180 degrees of arcuate travel;
an abrupt inflection point where said convex arcuate surface merges with a concavity; and continuing in a plurality of successive gradual convex and concave blended surfaces progressing rearwardly and faired to contact with a rearwardly directed surface flanking said front surface of a vehicle.

* * * * *